(12) United States Patent
Von Novak et al.

(10) Patent No.: US 10,181,241 B2
(45) Date of Patent: Jan. 15, 2019

(54) MODULATED WARNING LIGHTS FOR VEHICLES

(71) Applicant: QUALCOMM Incorporated, San Diego, CA (US)

(72) Inventors: William Henry Von Novak, San Diego, CA (US); Linda Stacey Irish, San Diego, CA (US); Joseph Burke, Glenview, IL (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/478,819

(22) Filed: Apr. 4, 2017

(65) Prior Publication Data

US 2018/0286188 A1  Oct. 4, 2018

(51) Int. Cl.
| | |
|---|---|
| G06G 7/70 | (2006.01) |
| G08B 5/22 | (2006.01) |
| B60Q 9/00 | (2006.01) |
| B60Q 1/46 | (2006.01) |
| H04N 5/225 | (2006.01) |
| H04M 1/22 | (2006.01) |
| G08B 5/38 | (2006.01) |
| B60Q 1/50 | (2006.01) |
| G08G 1/16 | (2006.01) |
| G08G 1/01 | (2006.01) |

(52) U.S. Cl.
CPC .............. *G08B 5/222* (2013.01); *B60Q 1/46* (2013.01); *B60Q 1/50* (2013.01); *B60Q 9/008* (2013.01); *G08B 5/38* (2013.01); *G08G 1/161* (2013.01); *G08G 1/166* (2013.01); *H04M 1/22* (2013.01); *H04N 5/2257* (2013.01); *G08G 1/012* (2013.01)

(58) Field of Classification Search
CPC . B60Q 1/46; B60Q 9/008; G08B 5/38; G05D 1/0234; G05D 1/0242; G05D 1/0293
See application file for complete search history.

(56) References Cited

U.S. PATENT DOCUMENTS

| | | |
|---|---|---|
| 2009/0072996 A1 | 3/2009 | Schoepp |
| 2011/0069965 A1* | 3/2011 | Kim .................... H04B 10/1149 398/130 |

(Continued)

FOREIGN PATENT DOCUMENTS

| | | |
|---|---|---|
| DE | 19756706 A1 | 6/1999 |
| DE | 102011005567 A1 | 9/2012 |
| FR | 2953623 A1 | 6/2011 |

OTHER PUBLICATIONS

International Search Report and Written Opinion—PCT/US2018/017239—ISA/EPO—dated May 29, 2018.

*Primary Examiner* — Hongmin Fan
(74) *Attorney, Agent, or Firm* — Harrity & Harrity, LLP (57) ABSTRACT

Certain aspects of the present disclosure generally relate to modulated warning lights for vehicles. In some aspects, a device may include an emitter to emit a warning light. The warning light may be in a visible spectrum. The device may include a modulator to modulate the warning light to generate a modulated warning light. The modulated warning light may be modulated to a particular pattern selected to convey a message. The message may be used to identify a carrier to which the device is attached such that the carrier is identifiable by a computer vision system that receives the modulated warning light.

30 Claims, 8 Drawing Sheets

(56) References Cited

U.S. PATENT DOCUMENTS

| | | | |
|---|---|---|---|
| 2012/0109454 A1 | 5/2012 | Fischer et al. | |
| 2013/0060400 A1* | 3/2013 | Hahne | G08G 1/161 |
| | | | 701/1 |
| 2013/0090802 A1* | 4/2013 | Curtis | G05D 1/024 |
| | | | 701/25 |
| 2013/0101285 A1* | 4/2013 | Shar | H04B 10/1149 |
| | | | 398/38 |
| 2014/0347648 A1 | 11/2014 | Roberts et al. | |
| 2015/0088373 A1* | 3/2015 | Wilkins | G05D 1/0234 |
| | | | 701/36 |
| 2015/0109148 A1 | 4/2015 | Cheatham, III et al. | |
| 2016/0026880 A1 | 1/2016 | Lee et al. | |
| 2016/0224227 A1* | 8/2016 | Brush | G06F 3/04847 |
| 2016/0229395 A1 | 8/2016 | Schmüdderich | |
| 2017/0120803 A1* | 5/2017 | Kentley | B60Q 1/26 |
| 2017/0187457 A1* | 6/2017 | Liu | H04B 10/116 |

\* cited by examiner

MODULATED WARNING LIGHTS FOR VEHICLES

FIELD OF THE DISCLOSURE

Aspects of the present disclosure generally relate to a device, and more particularly to modulated warning lights for vehicles.

BACKGROUND

A vehicle may include a warning light to alert an observer to the presence of the vehicle. For example, an automobile may include a set of tail lights, a set of hazard lights, or the like to ensure that an observer, such as a driver of another automobile, is alerted to the presence of the automobile. Similarly, bicycles may include a warning light to ensure that an observer, such as an automobile driver, a rider of another bicycle, a pedestrian, or the like, is alerted to the presence of the bicycle. Similarly, a pedestrian, such as a jogger, may attach a warning light or a reflective material to an article of clothing to ensure that an observer is alerted to the presence of the pedestrian. The warning lights may provide a constant light or may blink to ensure that the safety lights are noticed by an observer.

SUMMARY

In some aspects, a device may include an emitter to emit a warning light. The warning light may be in a visible spectrum. The device may include a modulator to modulate the warning light to generate a modulated warning light. The modulated warning light may be modulated to a particular pattern selected to convey a message. The message may be used to identify a carrier to which the device is attached such that the carrier is identifiable by a computer vision system that receives the modulated warning light.

In some aspects, a method of providing a modulated warning light may include determining, by a device, a message to convey. The message may be used to identify a carrier to which the device is attached such that the carrier is identifiable by a computer vision system that receives the message. The method may include modulating, by the device, a warning light based on the message. The warning light may be in a visible spectrum. The warning light may be modulated to a particular pattern selected to convey the message. The method may include providing, by the device, the modulated warning light.

In some aspects, a non-transitory computer-readable medium may store one or more instructions that, when executed by one or more processors of a device, cause the one or more processors to determine a message to convey. The message may be used to identify a carrier to which the device is attached such that the carrier is identifiable by a computer vision system that receives the message. The one or more instructions may cause the one or more processors to modulate a warning light based on the message. The warning light may be in a visible spectrum. The warning light may be modulated to a particular pattern selected to convey the message. The one or more instructions may cause the one or more processors to provide the modulated warning light.

In some aspects, an apparatus may include means for determining a message to convey. The message may be used to identify a carrier to which the apparatus is attached such that the carrier is identifiable by a computer vision system that receives the message. The apparatus may include means for modulating a warning light based on the message. The warning light may be in a particular portion of spectrum. The warning light may be modulated to a particular pattern selected to convey the message. The apparatus may include means for providing the modulated warning light.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

The detailed description set forth below, in connection with the appended drawings, is intended as a description of various configurations and is not intended to represent the only configurations in which the concepts described herein may be practiced. The detailed description includes specific details for providing a thorough understanding of the various concepts. However, it will be apparent to those skilled in the art that these concepts may be practiced without these specific details.

A warning light may be attached to a carrier, such as a vehicle or an article of clothing, to provide a visual warning of the presence of the carrier. For example, a flashing warning light may be attached to a bicycle to alert drivers of automobiles to a potential obstruction on the road (e.g., the bicycle). Similarly, a flashing warning light may be attached to an article of clothing being worn by, for example, a jogger to increase a likelihood that a driver of an automobile is alerted to the presence of the jogger. In another example, an automobile may be configured with daytime running lights to increase a visibility of the automobile to drivers of other automobiles, pedestrians, bicyclists, or the like. Increasing a visibility of a carrier, such as a bicycle, a pedestrian, or a vehicle may result in a reduced likelihood of an accident.

However, a warning light may fail to convey information that is used in determining a response to a potential hazard. For example, an autonomous vehicle may perform a first action based on identifying a pedestrian and a second action based on identifying another automobile. However, in a low-visibility scenario, such as a low-light scenario, a poor weather condition scenario, or the like, the autonomous vehicle may not be able to correctly determine whether a carrier is a pedestrian, an automobile, or the like based on the warning light. Moreover, an autonomous vehicle may utilize LIDAR signals to identify carriers within a threshold proximity. When a carrier is outside the threshold proximity, however, a reflection of the LIDAR signal may be too attenuated for detection.

Aspects, described herein, may utilize a modulated warning light to convey a message, such as a message regarding a carrier to which a warning device is attached. Moreover, the warning device may provide a modulated LIDAR signal as a response to receiving a LIDAR signal from, for example, a vehicle (e.g., an autonomous vehicle, a semi-autonomous vehicle, etc.). In this way, the warning device extends a range of a LIDAR system of the vehicle and conveys a message regarding a carrier to which the warning device is attached. Furthermore, the warning device improves identification of carriers by, for example, autonomous vehicles and provides a visual warning to observers. Moreover, based on improving identification of carriers, the warning device improves functioning of the vehicle, reduces a likelihood of traffic accidents, or the like.

Figure 1:
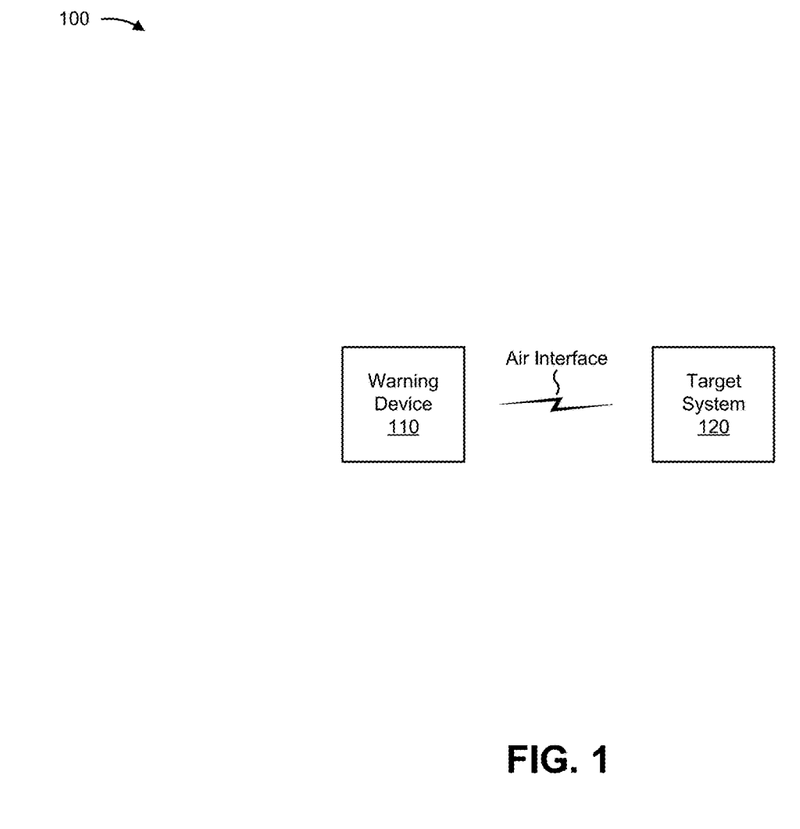
FIG. 1 is a diagram of an example environment in which systems and/or methods, described herein, may be implemented, in accordance with various aspects of the present disclosure.

FIG. 1 is a diagram of an example environment 100 in which systems and/or methods, described herein, may be implemented. As shown in FIG. 1, environment 100 may include a warning device 110 and a target system 120, which may be communicatively connected via an air interface, such as via a modulated warning light, a LIDAR signal, or the like.

Warning device 110 includes one or more devices capable of receiving, generating, storing, processing, and/or providing information relating to a modulated warning light. For example, warning device 110 may include a mobile device (e.g., a user equipment, a user device, a cell phone, etc.), a computer (e.g., a tablet computer, a laptop computer, etc.), a wearable device (e.g., a smartwatch, a pair of smart eyeglasses, etc.), another type of device that may be affixed to clothing, a body part, a vehicle, or another type of carrier, or the like that generates a warning light, modulates the warning light to generate a modulated warning light, and emits the modulated warning light to convey a message. In some aspects, warning device 110 may be affixed to a carrier (e.g., a person, a transportation vehicle, such as a bicycle or a scooter, or the like). In some aspects, the message may identify a carrier to which warning device 110 is affixed.

In some aspects, warning device 110 may include a receiver. For example, warning device 110 may include a receiver that receives a LIDAR signal and causes warning device 110 to transmit a modulated warning light to convey a response to the LIDAR signal that includes a message. In some aspects, warning device 110 may include one or more sensors. For example, warning device 110 may include a motion sensor to determine a speed of a carrier to which warning device 110 is attached, and warning device 110 may convey information identifying the speed of the carrier using the modulated warning light. In some aspects, warning device 110 may connect to an external sensor, and may receive sensor information from the external sensor.

In some aspects, warning device 110 includes an emitter to emit a warning light and a modulator to modulate the warning light to generate a modulated warning light. In some aspects, the warning light is in a visible spectrum. In some aspects, the modulated warning light is modulated to a particular pattern selected to convey a message. In some aspects, the message is used to identify a carrier to which the device is attached such that the carrier is identifiable by a computer vision system (e.g., target system 120) that receives the modulated warning light.

In some aspects, warning device 110 includes a receiver to receive a ranging light from a ranging transmitter. In some aspects, the modulated warning light is a response to the ranging light and is to be directed toward the ranging transmitter. In some aspects, a response time of the emitter to the ranging light is less than approximately 50 nanoseconds. In some aspects, the response time is in a range from approximately 10 nanoseconds to approximately 50 nanoseconds. In some aspects, the receiver is a camera of a mobile phone. In some aspects, the ranging transmitter is a LIDAR transmitter and the ranging light is a LIDAR light.

In some aspects, the computer vision system (e.g., target system 120) is a LIDAR-based system. In some aspects, the emitter controls a camera flash of a mobile phone, a screen of the mobile phone, a backlight of the screen of the mobile phone, or the like. In some aspects, the modulated warning light is a flashing light. In some aspects, a flash rate of the flashing light is selected to convey the message.

In some aspects, the particular pattern includes a non-return-to-zero encoding pattern, a Manchester encoding pattern, or the like. In some aspects, the modulated warning light includes a set of frequencies, where a first frequency, of the set of frequencies, is selected to provide a visual warning in the visible spectrum and a second frequency, of the set of frequencies, is selected to convey the message. In some aspects, the message includes a statically configured message, a dynamically reconfigurable message, or the like. In some aspects, the message includes information identifying a type of the carrier, a speed of the carrier, an identifier that identifies the carrier, a location of the carrier, a state of the carrier, or the like.

In some aspects, the modulated warning light is to include a first frequency associated with a first color of visible light and a second frequency associated with a second color of visible light, the first color of visible light is to be modulated to convey the message, and the second color of visible light is to be modulated to convey a warning. In some aspects, the first color of visible light is to be modulated during intervals when the second color of visible light is off.

In some aspects, the modulated warning light is to include a first frequency of invisible light and a second frequency of visible light, the invisible light is to be modulated to convey the message, and the visible light is to be modulated to convey a warning. In some aspects, the invisible light is to be modulated during intervals when the visible light is off. In some aspects, the invisible light is modulated such that the modulation is not detectable to the human eye.

In some aspects, warning device 110 includes a processor to obtain sensor data regarding the carrier and to determine a type of the carrier based on the sensor data. In some aspects, the sensor data includes data indicating a speed of the carrier. In some aspects, warning device 110 includes a processor to obtain sensor data regarding a change in speed of the carrier and to determine the message based on the sensor data.

Target system 120 includes one or more devices capable of receiving, generating, storing, processing, and/or providing information relating to a modulated warning light. For example, target system 120 may include a mobile device (e.g., a user equipment, a user device, a cell phone, etc.), a computer (e.g., a tablet computer, a laptop computer, an automobile on-board computer, etc.), a wearable device (e.g., a smartwatch, a pair of smart eyeglasses, etc.), a LIDAR device, a computer vision system, another type of device that can be affixed to an article of clothing, a body part, a vehicle, or another type of carrier, or the like. In some aspects, target system 120 may include an image sensor to obtain the modulated warning light based on warning device 110 transmitting the modulated warning light. In some aspects, target system 120 may include a data structure storing information associated with determining a message modulated into the modulated warning light. For example, target system 120 may store information identifying identifiers for different types of carriers, such as bicycles, vehicles, pedestrians, scooters, or the like, and may identify a type of carrier based on an identifier conveyed as a message using the modulated warning light.

The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. For example, a warning device 110 and a target system 120 may be combined in a single device that detects a modulated warning light from another warning device 110 and/or provides a modulated warning light toward another target system 120. Additionally, or alternatively, a set of devices (e.g., one or more devices) of environment 100 may perform one or more functions described as being performed by another set of devices of environment 100.

Figure 2:
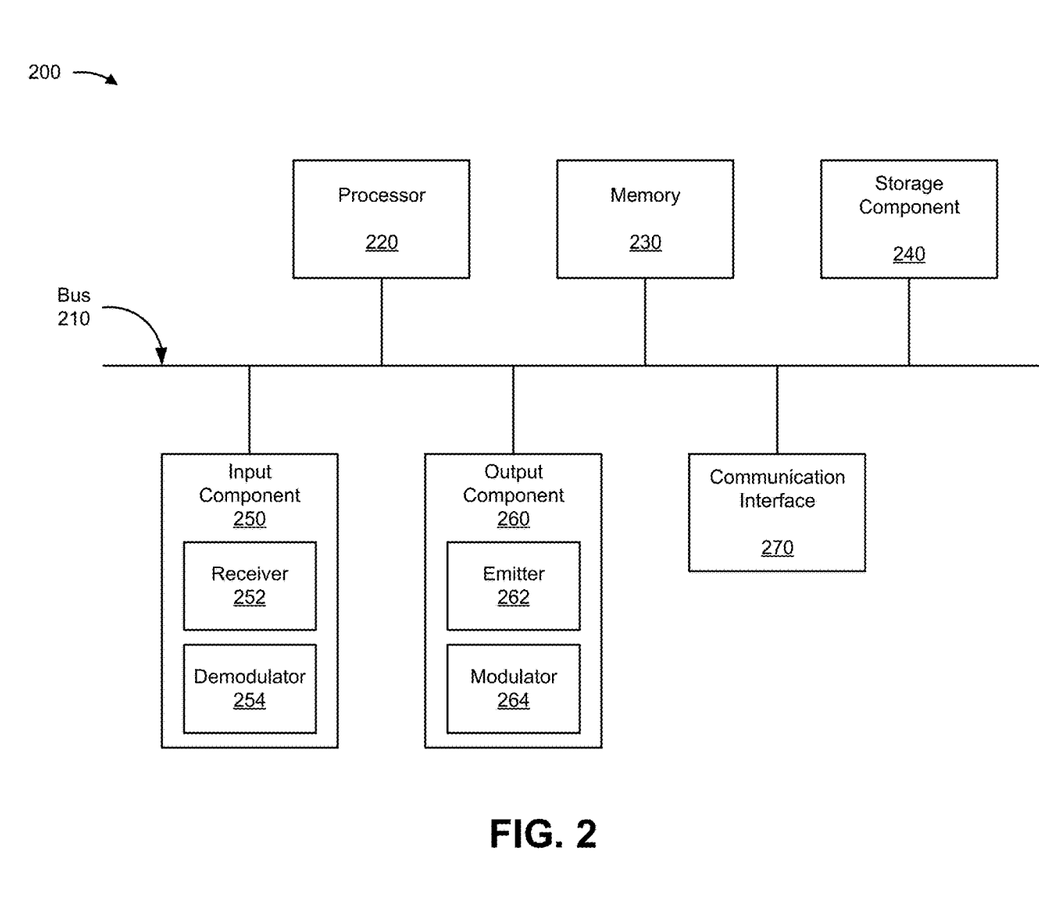
FIG. 2 is a diagram of example components of one or more devices of FIG. 1, in accordance with various aspects of the present disclosure.

FIG. 2 is a diagram of example components of a device 200. Device 200 may correspond to warning device 110 and/or target system 120. In some aspects, warning device 110 and/or target system 120 may include one or more devices 200 and/or one or more components of device 200. As shown in FIG. 2, device 200 may include a bus 210; a processor 220; a memory 230; a storage component 240; an input component 250, which may include a receiver 252 and a demodulator 254; an output component 260, which may include an emitter 262 and a modulator 264; and a communication interface 270.

Bus 210 includes a component that permits communication among the components of device 200. Processor 220 is implemented in hardware, firmware, or a combination of hardware and software. Processor 220 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 220 includes one or more processors capable of being programmed to perform a function. Memory 230 includes a random access memory (RAM), a read only memory (ROM), and/or another type of dynamic or static storage device (e.g., a flash memory, a magnetic memory, and/or an optical memory) that stores information and/or instructions for use by processor 220.

Storage component 240 stores information and/or software related to the operation and use of device 200. For example, storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 250 includes a component that permits device 200 to receive information, such as via user input (e.g., a touch screen display, a keyboard, a keypad, a mouse, a button, a switch, and/or a microphone). Additionally, or alternatively, input component 250 may include a sensor for sensing information (e.g., a global positioning system (GPS) component, an accelerometer, a gyroscope, and/or an actuator). In some aspects, the sensor component may correspond to receiver 252, which may be an optical receiver to detect an optical signal, such as a modulated warning light. In some aspects, receiver 252 may include a LIDAR receiver to detect a LIDAR signal. In some aspects, input component 250 may include a demodulator 254 to demodulate a modulated warning signal to determine a message conveyed by the modulated warning signal. In some aspects, a demodulator 254 of a first device 200 may include a component to detect a modulation used by a modulator 264 of a second device 200. For example, demodulator 254 of first device 200 may determine that modulator 264 of second device 200 caused a modulated warning signal to be associated with a particular encoding, frequency, or the like corresponding to a particular message.

Output component 260 includes a component that provides output information from device 200 (e.g., a display, a speaker, and/or one or more light-emitting diodes (LEDs)). For example, output component 260 may include emitter 262 to emit a warning light (e.g., a visible warning light, an invisible warning light, a combination of a visible warning light and an invisible warning light). In some aspects, emitter 262 may be a camera flash, a mobile phone screen, a mobile phone backlight, or the like of another device 200 connected emitter 262. For example, a warning device 110 may connect to a mobile phone to control a camera flash of the mobile phone to provide a modulated warning light to convey a message. In some aspects, output component 260 may include a modulator 264 to modulate the warning light to generate a modulated warning light to convey a message.

Communication interface 270 includes a transceiver-like component (e.g., a transceiver and/or a separate receiver and transmitter) that enables device 200 to communicate with other devices, such as via a wired connection, a wireless connection, or a combination of wired and wireless connections. Communication interface 270 may permit device 200 to receive information from another device and/or provide information to another device. For example, communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

Device 200 may perform one or more processes described herein. Device 200 may perform these processes in response to processor 220 executing software instructions stored by a non-transitory computer-readable medium, such as memory 230 and/or storage component 240. A computer-readable medium is defined herein as a non-transitory memory device. A memory device includes memory space within a single physical storage device or memory space spread across multiple physical storage devices.

Software instructions may be read into memory 230 and/or storage component 240 from another computer-readable medium or from another device via communication interface 270. When executed, software instructions stored in memory 230 and/or storage component 240 may cause processor 220 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

Figure 3:
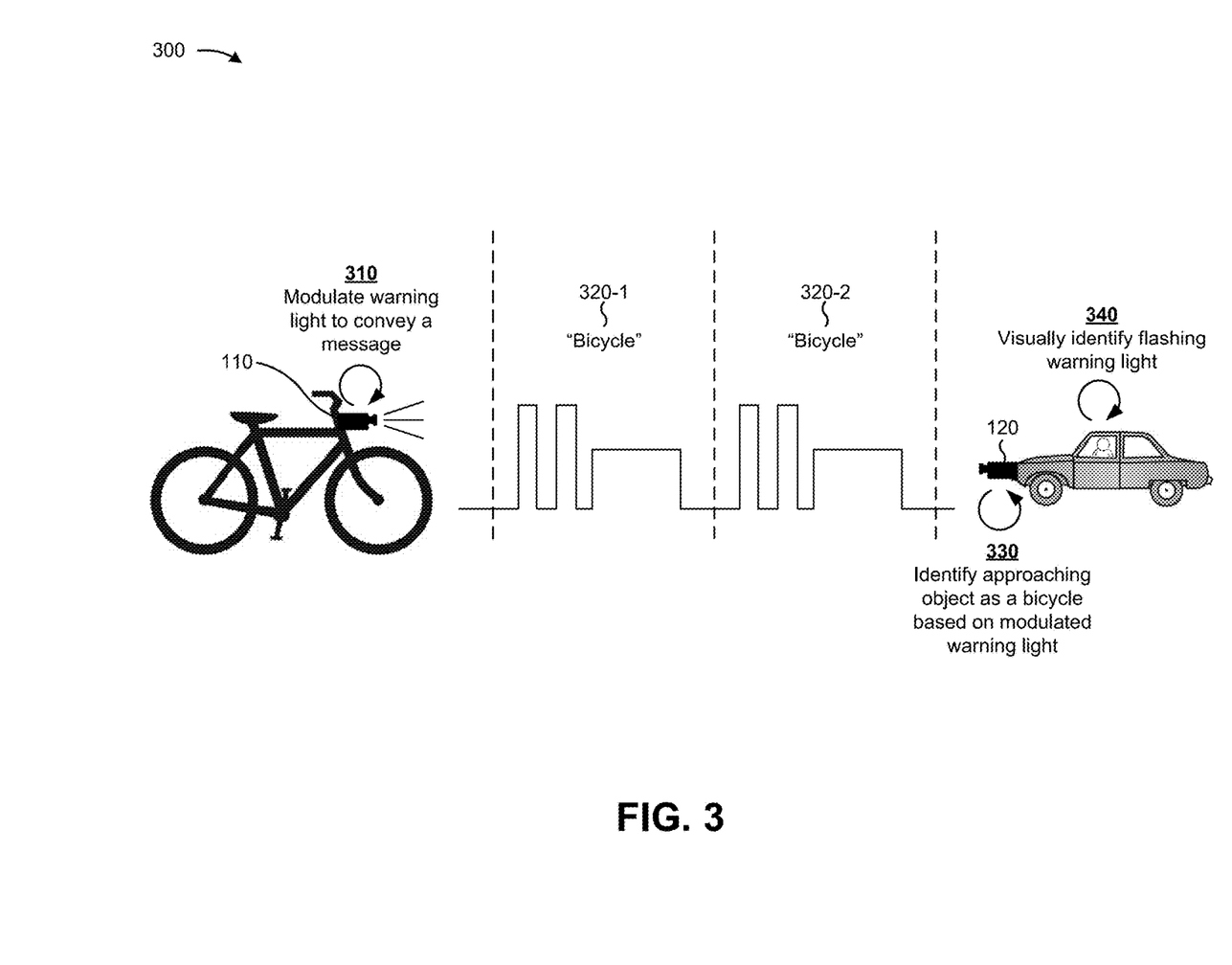
FIG. 3 is a diagram of an overview of an example aspect, in accordance with various aspects of the present disclosure.
Figure 4A:
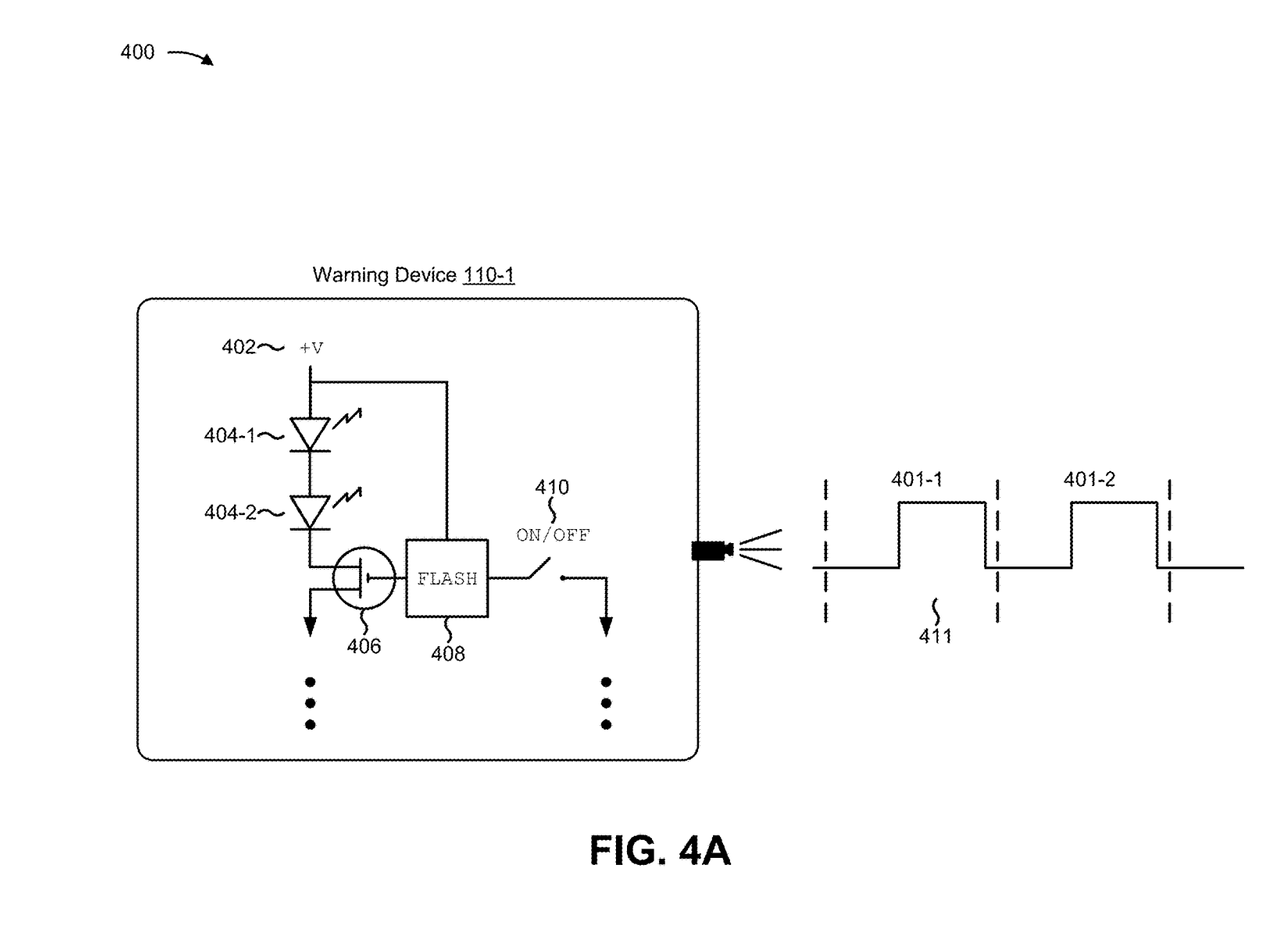
FIGS. 4A-4C are diagrams of an example aspect relating to the example process shown in FIG. 6, in accordance with various aspects of the present disclosure.
Figure 4B:
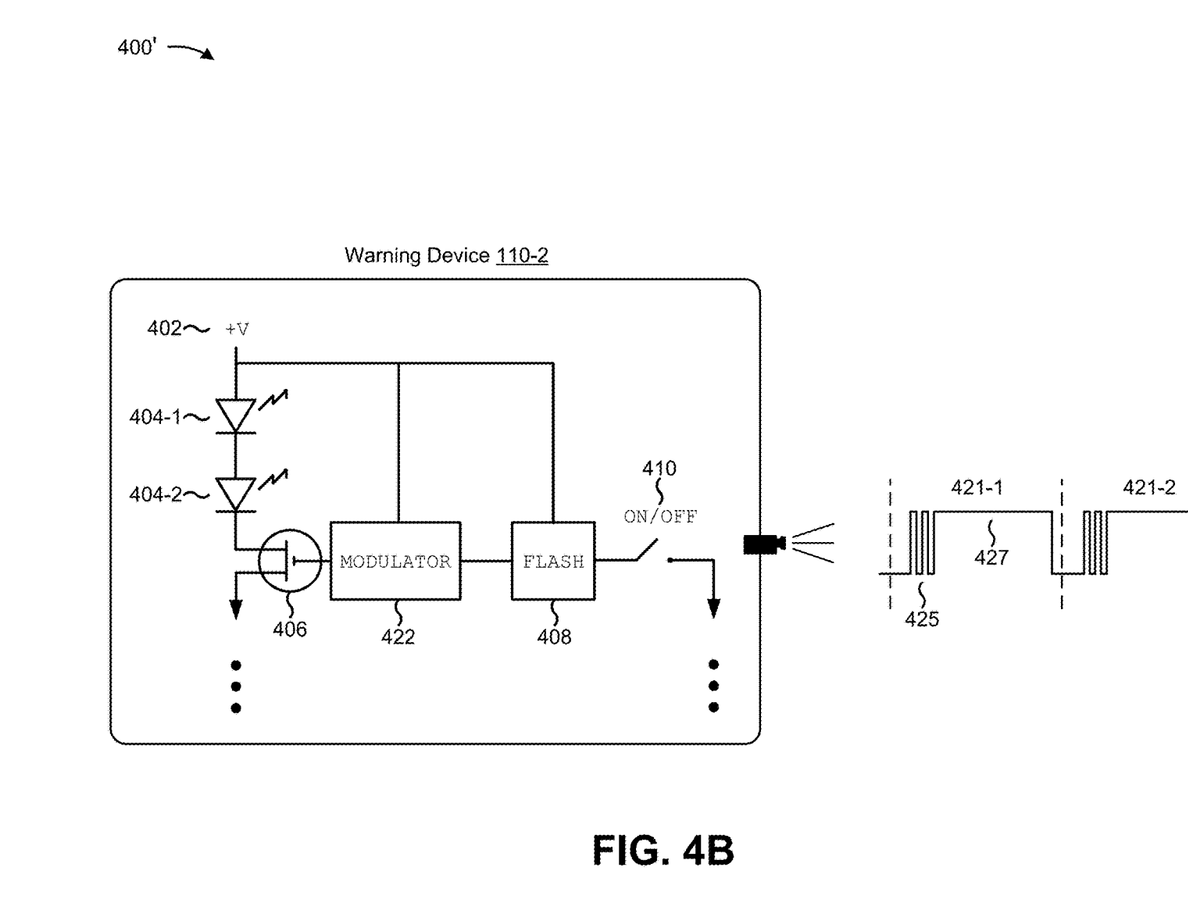
Figure 4C:
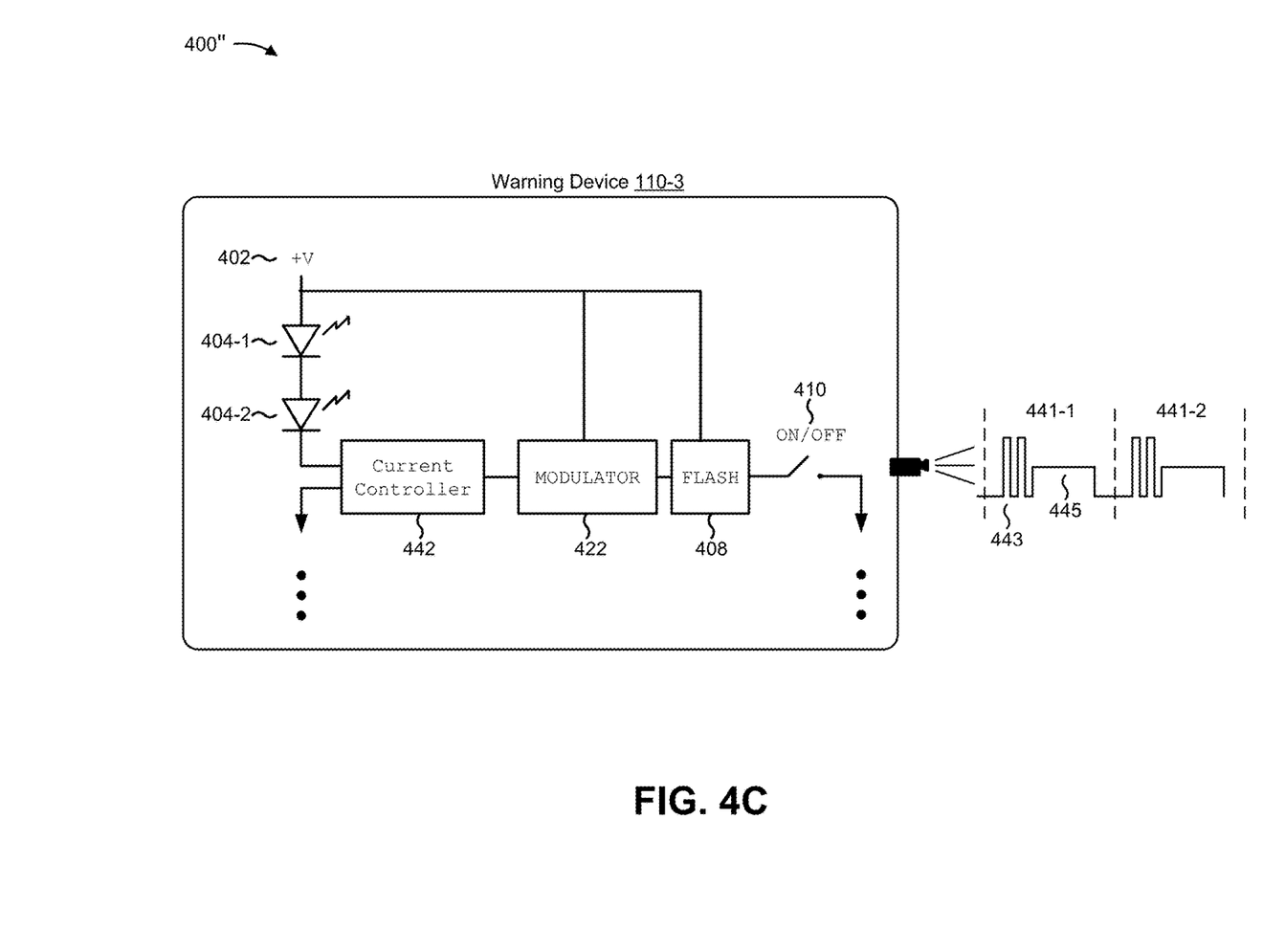
Figure 5:
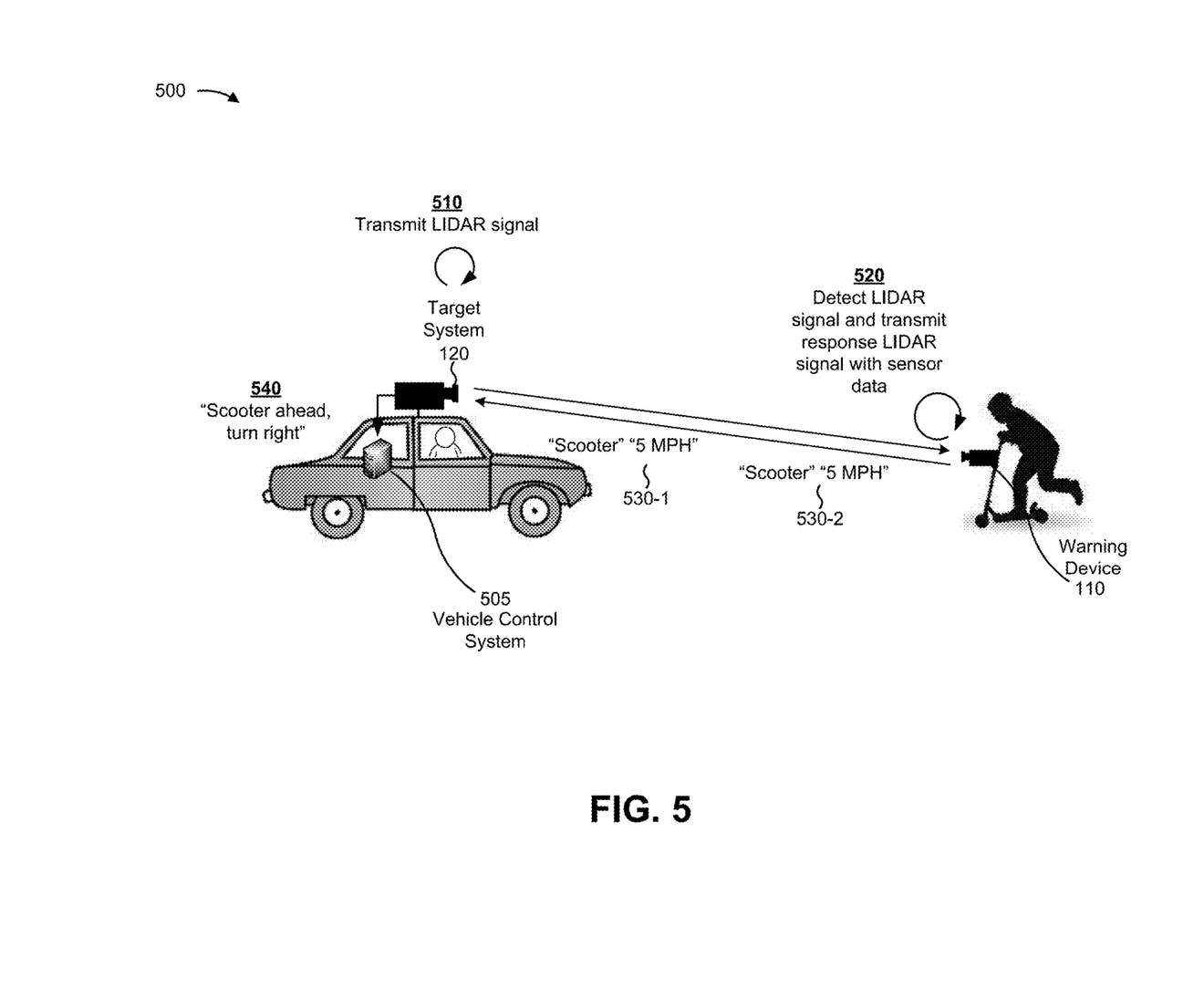
FIG. 5 is a diagram of another example aspect relating to the example process shown in FIG. 6, in accordance with various aspects of the present disclosure.
Figure 6:
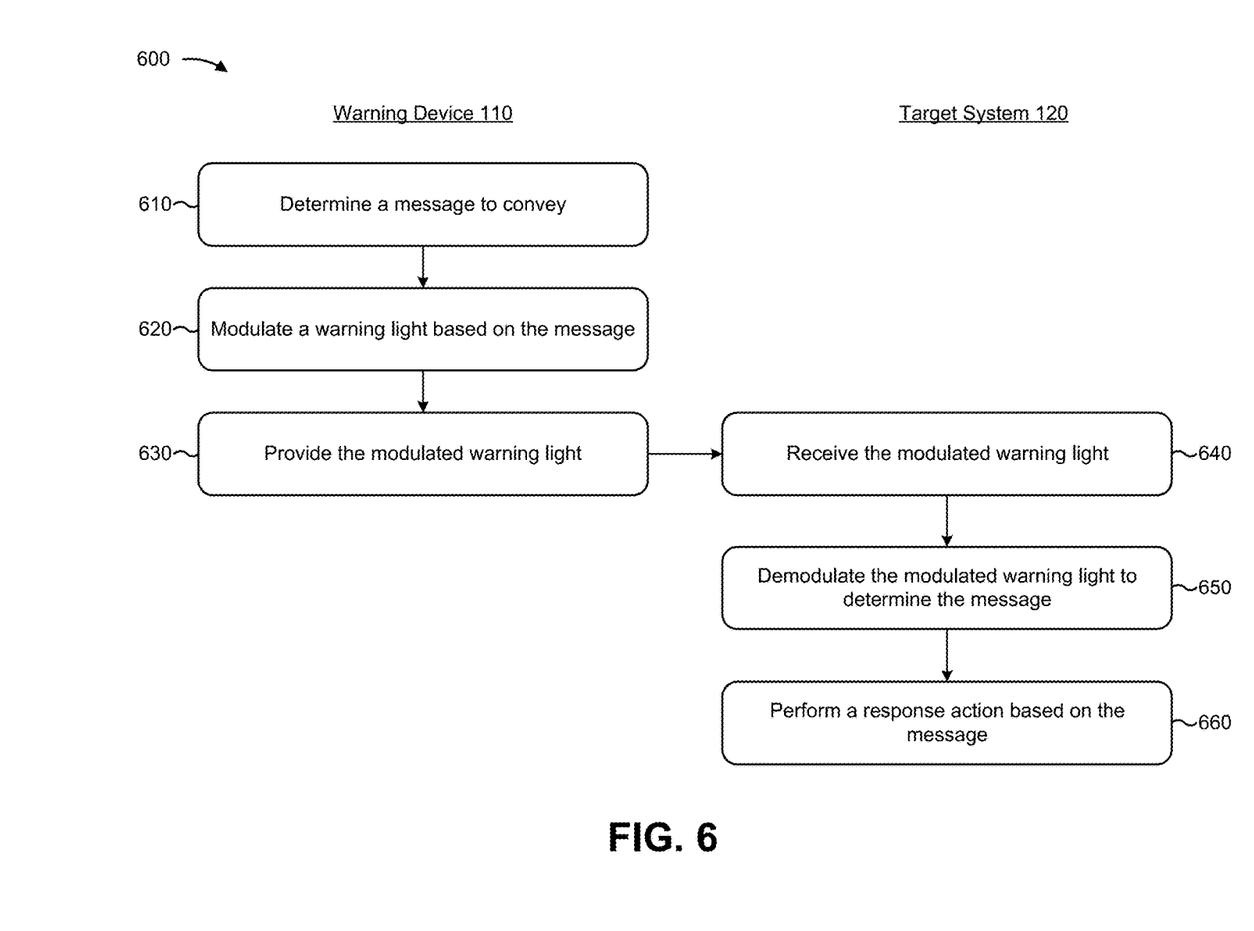
FIG. 6 is a flow chart of an example process for conveying a message using a modulated warning light, in accordance with various aspects of the present disclosure.

In some aspects, device 200 includes means for performing one or more processes described herein and/or means for performing one or more operations of the processes described herein, such as process 600 of FIG. 6 and/or one or more other processes described herein (e.g., with respect to FIGS. 3-5). For example, the means for performing the processes and/or operations described herein may include bus 210, processor 220, memory 230, storage component 240, input component 250, receiver 252, demodulator 254, output component 260, emitter 262, modulator 264, communication interface 270, and/or any combination thereof.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

FIG. 3 is a diagram of an overview of an example aspect 300 described herein. As shown in FIG. 3, example aspect 300 may include a warning device 110 attached to a bicycle and a target system 120 included in a vehicle.

As further shown in FIG. 3, and by reference number 310, warning device 110 may modulate a warning light to convey a message. For example, warning device 110 may include an emitter that emits the warning light. In some aspects, the warning light may be in the visible spectrum (i.e., visible to a human observer). For example, a light emitting diode of warning device 110 may emit a warning light, which may be modulated by a modulator of warning device 110. In some aspects, warning device 110 may use the modulator to modulate a message in the warning light. For example, warning device 110 may modulate the warning light using a particular pattern that identifies the bicycle to which warning device 110 is attached. In some aspects, the particular pattern may be detectable by a person. For example, warning device 110 may modulate the particular pattern such that a person can identify a pattern in the warning light (e.g., a dimming of the warning light, a flashing of the warning light, etc.). Additionally, or alternatively, the particular pattern may be modulated such that the particular pattern is invisible to a person. For example, warning device 110 may modulate the particular pattern in a portion of the spectrum that is invisible to a person (e.g., an infrared portion of the spectrum), at a frequency of repetition that is undetectable to a person (e.g., a dimming that happens at a rate such that the human eye cannot detect that the dimming has occurred, a color change at a granularity that the human eye cannot detect that the color change has occurred, etc.), or the like.

As further shown in FIG. 3, and by reference numbers 320-1 and 320-2, warning device 110 emits the warning light to convey the message. For example, warning device 110 emits light with a flash modulation that is selected in a preconfigured pattern that is identifiable by target system 120 (e.g., a computer vision system of the vehicle). In this case, warning device 110 conveys a particular message, bicycle, to target system 120. In some aspects, warning device 110 may convey another message, such as a message identifying a particular instance of a type of carrier (e.g., a message conveying a license plate number assigned to the bicycle, a bicycle serial number of the bicycle, a personal identifier of a user, etc.), a message identifying sensor data (e.g., a speed of the bicycle, a location identifier of a location of the bicycle, a direction that the bicycle is heading or is to turn, etc.), or the like.

As further shown in FIG. 3, and by reference number 330, target system 120 may identify an approaching carrier as a bicycle based on the modulated warning light. For example, target system 120 may demodulate the modulated warning light, and may determine that the message conveyed by the modulated warning light indicates that warning device 110 is attached to a bicycle. In this case, target system 120 may perform a response action to control the vehicle, such as by altering a direction or speed of the vehicle. As shown by reference number 340, a person inside the vehicle or another person located external to the vehicle, such as in another vehicle without a computer vision system, may visually identify the flashing warning light based on at least a portion of the modulated warning light being in the visible spectrum. In this case, target system 120 may perform another type of response action (or cause a response action to be performed) based at least in part on determining that warning device 110 is attached to a bicycle, such as by informing a driver of the vehicle via a windshield based display, causing an alert noise to be sounded inside the vehicle to alert the driver that the bicycle is within a threshold proximity, causing an alert noise to be sounded outside the vehicle to alert a rider of the bicycle that the vehicle is within a threshold proximity, or the like.

In this way, warning device 110 transmits a modulated warning light to provide information to a target system 120, thereby reducing a likelihood of a traffic accident relative to target system 120 attempting to influence operation of the vehicle without information indicating that the carrier is a bicycle. Moreover, based on transmitting the modulated warning light at least partially in the visible spectrum, warning device 110 reduces a likelihood that a person does not identify the carrier relative to transmitting an alert to target system 120 only in an invisible spectrum (e.g., in an infrared spectrum, in a microwave spectrum, in a high frequency spectrum, via a Wi-Fi connection, via a Bluetooth connection, via a cellular connection, or the like). Furthermore, based on conveying the information identifying the carrier via a modulated warning light, warning device 110 reduces network traffic relative to utilizing a cellular connection or the like to convey the information.

As indicated above, FIG. 3 is provided merely as an example. Other examples are possible and may differ from what was described with regard to FIG. 3.

FIGS. 4A-4C are diagrams of example aspects 400/400'/400" relating to example process 600 shown in FIG. 6. FIGS. 4A-4C show an example of conveying a message using a modulated warning light.

As shown in FIG. 4A, example aspect 400 includes a warning device 110-1. Warning device 110-1 generates a first modulated warning light including a repeating message 401, shown as a first message 401-1 and a second message 401-2. Warning device 110-1 generates repeating message 401 using a voltage source 402, a set of warning light diodes 404-1 and 404-2, a transistor 406, a flash circuit 408, and an on/off switch 410. In this case, warning device 110 encodes messages 401 using an on/off encoding to convey a static message. For example, region 411 representing an intensity of messages 401 is perceptible to humans to cause humans to be alerted to a presence of a carrier to which warning device 110-1 is attached and may be demodulated by a target system 120 to determine information regarding the carrier to which warning device 110-1 is attached. In this case shown, modulation is caused by controlling a frequency and on-time of warning light diodes 404-1 and 404-2, and may be identical to the visible flash rate. In some aspects, flash circuit 408 may include a circuit to cause a flash pattern (e.g., the visible flash rate) of visible light to be provided. In some aspects, flash circuit 408 may include a wireless transmitter and antenna to cause a modulated warning signal to be provided via, for example, a non-visible light. For example, during a light-visibility scenario (e.g., a fog scenario, a rain scenario, etc.), flash circuit 408 may use a wireless transmitter and antenna to transmit a modulated message via a non-visible portion of spectrum.

As shown in FIG. 4B, example aspect 400' includes a warning device 110-2. Warning device 110-2 generates a second modulated warning light including a repeating message 421, shown as a first message 421-1 and a second message 421-2. Warning device 110-2 generates repeating message 421 using a voltage source 402, a set of warning light diodes 404-1 and 404-2, a transistor 406, a modulator 422, a flash circuit 408, and an on/off switch 410. In this case, warning device 110 encodes messages 421 using a single level modulation encoding (e.g., a single intensity of light) to convey a message. For example, region 425 of messages 421 includes a modulation that is imperceptible to humans (e.g., approximately 25 Hz) and conveys a message regarding a carrier to which warning device 110-2 is attached to a target system 120 (e.g., region 425 is associated with a frequency that identifies the carrier), and region 427 of messages 421 includes a modulation that is perceptible to humans (e.g., approximately 2 Hz) to cause humans to be alerted to a presence of the carrier to which warning device 110-2 is attached.

As shown in FIG. 4C, example aspect 400" includes a warning device 110-3. Warning device 110-3 generates a third modulated warning light including a repeating message 441, shown as a first message 441-1 and a second message 441-2. Warning device 110-3 generates repeating message 441 using a voltage source 402, a set of warning light diodes 404-1 and 404-2, a current controller 442, a modulator 422, a flash circuit 408, and an on/off switch 410. In this case, warning device 110 encodes messages 441 using a multi-level modulation encoding (e.g., multiple intensities of light) to convey a message. For example, region 443 of messages 441 includes, at a first intensity, a modulation that is imperceptible to humans and conveys a message regarding a carrier to which warning device 110-2 is attached to a target system 120, and region 445 of messages 441 includes, at a second intensity, a modulation that is perceptible to humans to cause humans to be alerted to a presence of the carrier to which warning device 110-2 is attached.

As indicated above, FIGS. 4A-4C are provided merely as examples. Other examples are possible and may differ from what was described with regard to FIGS. 4A-4C.

FIG. 5 is a diagram of an example aspect 500 relating to example process 600 shown in FIG. 6. FIG. 5 shows an example of conveying a message using a modulated warning light.

As shown in FIG. 5, example aspect 500 includes a warning device 110 attached to a scooter and a target system 120 connected to a vehicle control system 505 of an automobile. As shown by reference number 510, target system 120 transmits a LIDAR signal that is directed toward warning device 110. As shown by reference number 520, warning device 110 detects the LIDAR signal, and transmits a response LIDAR signal including sensor data. For example, warning device 110 may detect the LIDAR signal, may obtain sensor data from an accelerometer identifying a speed of the scooter, and may modulate a warning light (i.e., the LIDAR response signal) to convey a message 530 via the LIDAR response signal. As shown by reference numbers 530-1 and 530-2, warning device 110 transmits a modulated warning light as the response to the LIDAR signal, and conveys information identifying a type of carrier to which warning device 110 is attached and a speed of the carrier. As shown by reference number 540, based on target system 120 receiving messages 530, target system 120 instructs vehicle control system 505 that a scooter is within a threshold proximity of the vehicle, and to change directions to avoid the scooter. Based on providing the LIDAR response signal, warning device 110 extends a range of target system 120 (i.e., a LIDAR system) by transmitting a LIDAR response to permit detection by target system 120 (e.g., the modulated warning light) when warning device 110 is out of range for a LIDAR signal reflection to be detected. Moreover, based on modulating a message into the LIDAR response signal, warning device 110 may act as a LIDAR transponder for target system 120, thereby improving functionality of target system 120.

As indicated above, FIG. 5 is provided merely as an example. Other examples are possible and may differ from what was described with regard to FIG. 5.

FIG. 6 is a flow chart of an example process 600 for conveying a message using a modulated warning light. In some aspects, one or more process blocks of FIG. 6 may be performed by warning device 110 and/or target system 120. In some aspects, one or more process blocks of FIG. 6 may be performed by another device or a group of devices separate from or including warning device 110 and/or target system 120.

As shown in FIG. 6, process 600 may include determining a message to convey (block 610). For example, warning device 110 may determine the message to convey. In some aspects, warning device 110 may select a pre-configured message to convey. For example, warning device 110 may be attached to a bicycle and may be pre-configured to convey a message indicating that warning device 110 is attached to the bicycle. Additionally, or alternatively, warning device 110 may convey another pre-configured message, such as a message indicating that warning device 110 is attached to another type of vehicle (e.g., a stroller, a scooter, a Segway, an aircraft, etc.), another type of carrier (e.g., a pedestrian, a child, etc.), or the like. In this case, a user may select a particular type of warning device 110 based on the particular type of carrier to which warning device 110 is to be attached.

In some aspects, warning device 110 may determine to convey an identifier associated with a carrier to which warning device 110 is attached or an identifier associated with warning device 110. For example, warning device 110 may receive input via a user interface associated with identifying a license plate number of an automobile to which warning device 110 is attached. Additionally, or alternatively, warning device 110 may determine to convey a user identifier (e.g., a user name), a serial number (e.g., identifying warning device 110), or the like. For example, warning device 110 may determine to provide information that may permit determining a location of a missing person, such as a missing child at a crowded location (e.g., an amusement park), based on target system 120 identifying the message conveyed by the modulated warning light.

In some aspects, warning device 110 may determine the message to convey based on sensor data. For example, based on sensor data, warning device 110 may determine a type of carrier to which warning device 110 is attached. When the sensor data relates to a travel speed of the carrier, warning device 110 may compare the travel speed to different ranges of speeds to determine the type of carrier. For example, warning device 110 may determine that a carrier with a travel speed in a first range of speeds may be associated with a first type of carrier (e.g., a child); a carrier with a travel speed in a second range of speeds may be associated with a second type of carrier (e.g., an adult); a carrier with a travel speed in a third range of speeds may be associated with a third type of carrier (e.g., a scooter); a carrier with a travel speed in a fourth range of speeds may be associated with a fourth type of carrier (e.g., a bicycle); a carrier with a travel speed in a fifth range of speeds may be associated with a fifth type of carrier (e.g., a motorcycle); or the like. Additionally, or alternatively, warning device 110 may determine that based on being mounted to a carrier at a first mounting angle, the carrier is a first type of carrier (e.g., a child); based on being mounted at a second mounting angle, the carrier is a second type of carrier (e.g., an adult); based on being mounted at a third mounting angle, the carrier is a third type of carrier (e.g., a truck), etc.

In some aspects, warning device 110 may determine to convey sensor data. For example, warning device 110 may determine a speed at which warning device 110 is being moved (e.g., based on receiving information from a vehicle speedometer, a global positioning system (GPS) module, an accelerometer, or the like), and may determine to convey a message identifying the speed at which warning device 110 is being moved. Additionally, or alternatively, warning device 110 may determine to convey other sensor data, such as a turn indicator, a status identifier (e.g., information indicating that a check engine indicator is activated, that a tire pressure gauge alert is activated, etc.), a location identifier, or the like. For example, warning device 110 may receive input, such as via a wireless link with a car area network, a user interface with which to receive a user selection of information, or the like identifying a status of a vehicle, and warning device 110 may determine to modulate a warning light to identify the status of the vehicle to target system 120.

In some aspects, warning device 110 may determine the message to convey based on a trigger. For example, based on warning device 110 detecting a LIDAR signal from target system 120, warning device 110 may determine to convey a response message as a response to the LIDAR signal. In this case, warning device 110 may determine to provide a LIDAR signal as a response, and to convey information regarding warning device 110 modulated into or in association with the response LIDAR signal, such as information identifying a location of warning device 110, a type of carrier to which warning device 110 is attached, an identifier of the carrier to which warning device 110 is attached, an identifier of warning device 110, or the like.

As further shown in FIG. 6, process 600 may include modulating a warning light based on the message (block 620). For example, warning device 110 may modulate the warning light. In some aspects, warning device 110 may modulate the warning light using a static (i.e., fixed) pattern. For example, warning device 110 may use on/off modulation to modulate a particular pattern into the warning light to convey the message. In this case, the particular pattern may be selected based on information included in a data structure identifying a set of candidate patterns corresponding to a set of candidate messages. In some aspects, warning device 110 may modulate the warning light in a pattern that is perceivable by a person. For example, warning device 110 may modulate the warning light at such a rate that a person perceives the warning light as flashing (e.g., an approximately 1 hertz (Hz) flash rate, an approximately 2 Hz flash rate, and approximately 10 Hz flash rate, etc.). In some aspects, warning device 110 may select the flash rate to convey the message. For example, warning device 110 may select a first flash rate to convey a first message (e.g., that warning device 110 is attached to a bicycle), and a second flash rate to convey a second message (e.g., that warning device 110 is attached to a pedestrian).

In some aspects, warning device 110 may modulate a non-visible warning light, such as a warning signal for a wireless communications system. For example, when operating in a low-visibility scenario (e.g., a fog scenario, a rain scenario, etc.), warning device 110 may modulate a non-visible warning light or a non-visible portion of the warning light to ensure that the warning message is conveyed during the low-visibility scenario. In this case, warning device 110 may transmit the warning signal in a particular portion of spectrum (e.g., a non-visible portion of spectrum).

In some aspects, warning device 110 may perform multiple modulations to modulate the warning light. For example, warning device 110 may perform a first modulation using on/off modulation to provide a visible warning to a person (e.g., a driver, a pedestrian, etc.), and may perform a second modulation using another type of modulation to provide information to target system 120. In this case, warning device 110 may utilize a particular type of modulation for the second modulation. For example, warning device 110 may select on/off modulation at another frequency (e.g., approximately 25 Hz, 50 Hz, 100 Hz, etc.) for the second modulation, which may cause the warning light to appear as an intensity change (e.g., a slight dimming or brightening) of the first on/off modulation to a human observer. In some aspects, warning device 110 may perform the second modulation of a second color of light during periods when the first modulation of a first color of light causes the first color of light to be off.

In some aspects, warning device 110 may utilize a particular type of encoding to modulate the warning light to convey the message. For example, warning device 110 may modulate the warning light using non-return-to-zero (NRZ) encoding. In this case, a transition during a particular interval from on to off or from off to on may represent a '1' bit and a lack of a transition during the particular interval may represent a '0' bit, or vice versa. Additionally, or alternatively, warning device 110 may utilize a Manchester encoding. In this case, a transition from low intensity to high intensity may represent a '0' bit and a transition from high intensity to low intensity may represent a '1' bit, or vice versa. In this way, warning device 110 may encode bits without a direct current (DC) bias, and without an intensity of light perceivable to a person being altered. Although described herein, in terms of a particular set of encodings, other encodings may be possible and may differ from what was described herein.

In some aspects, warning device 110 may modulate multiple warning lights. For example, warning device 110 may modulate a first portion of the warning light using a flashing pattern (e.g., an on/off modulation) to provide a visual warning to a person, and may modulate a second portion of the warning light to convey the message to target system 120. In some aspects, warning device 110 may modulate a second portion of the warning light that is visible. For example, warning device 110 may modulate a first color of light (e.g., a yellow light) to be perceptible to a person and may modulate a second color of light (e.g., a red light) to convey the message to target system 120. In some aspects, warning device 110 may modulate a second frequency of light that is invisible. For example, warning device 110 may modulate a visible portion of light (e.g., a red light) to be perceptible to a person and may modulate an invisible portion of light (e.g., an infrared light) to convey the message to target system 120. In some aspects, the first portion of the modulated warning light and the second portion of the modulated warning light may be emitted by a single emitter, such as a single LED. In some aspects, the first portion of the modulated warning light may be emitted by a first emitter and the second portion of the modulated warning light may be emitted by a second emitter.

In some aspects, warning device 110 may cause a particular warning light to be generated, and may modulate the warning light based on causing the particular warning light to be generated. For example, as a response to receiving a LIDAR signal, warning device 110 may cause a response LIDAR signal to be generated and may convey the message in association with the response LIDAR signal. In this case, warning device 110 may modulate the response LIDAR signal to convey the message, may modulate another warning light conveyed concurrent with the LIDAR signal to convey the message, may modulate another warning light conveyed before or after the LIDAR signal to convey the message, or the like.

As further shown in FIG. 6, process 600 may include providing the modulated warning light (block 630). For example, warning device 110 may provide the modulated warning light. In some aspects, warning device 110 may emit the modulated warning light. For example, based on warning device 110 generating the warning light and modulating the warning light to generate the modulated warning light, warning device 110 may emit the modulated warning light for detection by a person, by target system 120, or the like. In some aspects, warning device 110 may cause the modulated warning light to be emitted. For example, warning device 110 may cause an emitter to emit the modulated warning light based on causing a modulator to modulate the warning light to generate the modulated warning light.

In some aspects, warning device 110 may provide the modulated warning light to an intended target. For example, based on receiving a LIDAR signal from target system 120, warning device 110 may provide the modulated warning light toward target system 120 as a response LIDAR signal. Additionally, or alternatively, warning device 110 may provide the modulated warning signal without an intended target. For example, warning device 110 may transmit the modulated warning light, and the modulated warning light may or may not be detected by target system 120, by a person, or the like. In this way, by transmitting without an intended target, warning device 110 increases a likelihood that a target system 120 detects warning device 110 when target system 120 is within range of warning device 110 relative to transmitting based on detecting a presence of target system 120.

As further shown in FIG. 6, process 600 may include receiving the modulated warning light (block 640). For example, target system 120 may receive the modulated warning light based on warning device 110 providing the modulated warning light. In some aspects, target system 120 may receive the modulated warning light as a response signal. For example, based on target system 120 transmitting a LIDAR signal toward a target (e.g., warning device 110) to reflect back to target system 120, target system 120 may receive a response LIDAR signal from warning device 110. Additionally, or alternatively, target system 120 may receive the modulated warning light based on monitoring for the modulated warning light. For example, when target system 120 is configured to detect modulated warning lights from warning devices 110, target system 120 may monitor an image sensor of target system 120 to detect the modulated warning light from warning device 110.

As further shown in FIG. 6, process 600 may include demodulating the modulated warning light to determine the message (block 650). For example, target system 120 may demodulate the modulated warning light. In some aspects, target system 120 may perform a particular type of demodulation to demodulate the modulated warning light. For example, based on target system 120 being configured to detect modulated warning lights modulated using a particular encoding (e.g., NRZ encoding, Manchester encoding, etc.), target system 120 may demodulate the modulated warning light based on the particular encoding to determine the message conveyed by the modulated warning light.

In some aspects, target system 120 may perform multiple demodulations of the modulated warning light. For example, target system 120 may perform multiple demodulations based on multiple candidate encodings to determine multiple candidate messages, and may select a particular candidate message. In this case, target system 120 may select the particular candidate message based on one or more decision criteria, such as the candidate message corresponding to an expected message content (e.g., an expected static message content, such as a message identifying a bicycle, an expected dynamic message content, such as a message identifying a speed of a carrier, or the like).

In some aspects, target system 120 may determine the modulation of the modulated warning light to demodulate the modulated warning light and determine the message. For example, based on target system 120 determining that the modulated warning light is modulated to flash at a particular frequency (e.g., approximately 2 Hz, approximately 25 Hz, etc.), target system 120 may determine a message associated with the particular frequency (e.g., a message identifying a carrier attached to warning device 110 as a bicycle, a pedestrian, an automobile, etc.).

As further shown in FIG. 6, process 600 may include performing a response action based on the message (block 660). For example, target system 120 may perform the response action based on the message. In some aspects, target system 120 may perform a control action. For example, based on determining that a carrier is within a particular proximity of an autonomous vehicle with which target system 120 is associated, target system 120 may alter a direction or speed of the autonomous vehicle. In this case, target system 120 may perform a first response action based on a first message (e.g., alter the direction or speed to a first value based on determining that a bicycle is within a threshold proximity of the autonomous vehicle), and may perform a second response action based on a second message (e.g., alter the direction or speed to a second value based on determining that an automobile is within a threshold proximity of the autonomous vehicle). In this way, warning device 110 improves control of an autonomous vehicle by providing information relating to a carrier to which warning device 110 is attached in a modulated warning light to cause target system 120 to perform a response action relative to target system 120 performing the response action without the information relating to the carrier.

In some aspects, target system 120 may perform a response action associated with identifying the message. For example, target system 120 may cause the message or information associated with the message to be provided via a user interface. For example, target system 120 may cause a windshield based display to provide information identifying the carrier, such as a description of the carrier, an indicator of a location of the carrier, an identification of the carrier, etc. In some aspects, target system 120 may cause a change to a speed or direction of a vehicle to which target system 120 is attached. In some aspects, target system 120 may cause an alert to be provided, such as an audible alert to a vehicle driver, an audible alert to a driver of the carrier, an audible alert to the carrier, etc. In some aspects, target system 120 may cause a user interface to identify a location of a carrier, such as a missing person, based on determining a message that conveys a user identifier associated with the missing person. Additionally, or alternatively, target system 120 may plot a location of warning device 110 on a user interface-based map based on determining a message that conveys a location identifier for a carrier to which warning device 110 is attached. In some aspects, based on target system 120 detecting a first modulated light from a first warning device 110, target system 120 may cause a second warning device 110 associated with target system 120 to provide a modulated warning light as a response. In this case a second target system 120 associated with the first warning device 110 may detect the modulated warning light response and may provide an alert. Additionally, or alternatively, target system 120 may cause another device to perform a response action. For example, when target system 120 is associated with a parking garage entry system, target system 120 may open an entry/exit gate of a parking garage based on detecting warning device 110, and may cause a user of warning device 110 to be billed for use of the parking garage based on identifying the user based on the modulated warning light.

Additionally, or alternatively, process 600 may include receiving a ranging light from a ranging transmitter and modulating the warning light as a response to the ranging light, where the modulated warning light is to be directed to the ranging transmitter. Additionally, or alternatively, the ranging transmitter may be a LIDAR transmitter and the ranging light may be a LIDAR light.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

In this way, warning device 110 improves navigation of vehicles by providing information regarding potential hazards to augment information automatically obtained by autonomous vehicles, and to assist when autonomous vehicles are unable to identify a carrier to which warning device 110 is attached, such as in a low-light or poor weather condition. Moreover, warning device 110 causes carriers to which warning device 110 is attached to be noticed by humans, by including a portion of the warning light in a spectrum of light (e.g., visible light) that is perceptible to humans. Furthermore, warning device 110 reduces network traffic relative to target systems 120 obtaining information regarding potential hazards via, for example, cellular connections.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, and/or a combination of hardware and software.

Some aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some aspects, a user may interact with the information, such as by providing input via an input component of a device that provides the user interface for display. In some aspects, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
an emitter to emit a warning light,
the warning light being in a visible spectrum; and
a modulator to modulate the warning light to generate a modulated warning light,
the modulated warning light being modulated to a particular pattern selected to convey a message,
the message identifying a carrier to which the device is attached such that the carrier is identifiable by a computer vision system that receives the modulated warning light,
the modulated warning light being a response to a ranging light from a ranging transmitter, and
the modulated warning light being directed toward the ranging transmitter.

2. The device of claim 1, further comprising:
a receiver to receive the ranging light from the ranging transmitter.

3. The device of claim 1, wherein a response time of the emitter to the ranging light is less than approximately 50 nanoseconds.

4. The device of claim 3, wherein the response time is in a range from approximately 10 nanoseconds to approximately 50 nanoseconds.

5. The device of claim 2, wherein the receiver is a camera of a mobile phone.

6. The device of claim 1, wherein the ranging transmitter is a LIDAR transmitter and the ranging light is a LIDAR light.

7. The device of claim 1, wherein the computer vision system is a LIDAR-based system.

8. The device of claim 1, wherein the emitter controls at least one of:
a camera flash of a mobile phone,
a screen of the mobile phone, or
a backlight of the screen of the mobile phone.

9. The device of claim 1, wherein the modulated warning light is a flashing light.

10. The device of claim 9, wherein a flash rate of the flashing light is selected to convey the message.

11. The device of claim 1, wherein the particular pattern includes at least one of:
a non-return-to-zero encoding pattern, or
a Manchester encoding pattern.

12. The device of claim 1, wherein the modulated warning light includes a set of frequencies,
a first frequency, of the set of frequencies, being selected to provide a visual warning in the visible spectrum, and
a second frequency, of the set of frequencies, being selected to convey the message.

13. The device of claim 1, wherein the message includes information identifying at least one of:
a type of the carrier,
a speed of the carrier,
an identifier that identifies the carrier,
a location of the carrier, or
a state of the carrier.

14. The device of claim 1, wherein the modulated warning light is to include a first frequency associated with a first color of visible light and a second frequency associated with a second color of visible light,
the first color of visible light to be modulated to convey the message, and
the second color of visible light to be modulated to convey a warning.

15. The device of claim 14, wherein the first color of visible light is to be modulated during intervals when the second color of visible light is off.

16. The device of claim 1, wherein the modulated warning light is to include a first frequency of invisible light and a second frequency of visible light,
the invisible light to be modulated to convey the message, and
the visible light to be modulated to convey a warning.

17. The device of claim 16, wherein the invisible light is to be modulated during intervals when the visible light is off.

18. The device of claim 16, wherein the invisible light is modulated such that the modulation is not detectable to a human eye.

19. The device of claim 1, further comprising:
a processor to obtain sensor data regarding the carrier and to determine a type of the carrier based on the sensor data.

20. The device of claim 19, wherein the sensor data includes data indicating a speed of the carrier.

21. The device of claim 1, further comprising:
a processor to obtain sensor data regarding a change in speed of the carrier and to determine the message based on the sensor data.

22. A method of providing a modulated warning light, comprising:
determining, by a device, a message to convey,
the message identifying a carrier to which the device is attached such that the carrier is identifiable by a computer vision system that receives the message;
modulating, by the device, a warning light based on the message,
the warning light being in a visible spectrum, and
the warning light being modulated to a particular pattern selected to convey the message; and
providing, by the device, the modulated warning light,
the modulated warning light being a response to a ranging light from a ranging transmitter, and
the modulated warning light being directed toward the ranging transmitter.

23. The method of claim 22, further comprising:
receiving the ranging light from the ranging transmitter,
wherein modulating the warning light comprises:
modulating the warning light as the response to the ranging light.

24. The method of claim 22, wherein the ranging transmitter is a LIDAR transmitter and the ranging light is a LIDAR light.

25. A non-transitory computer-readable medium storing instructions, the instructions comprising:
one or more instructions that, when executed by one or more processors of a device, cause the one or more processors to:
determine a message to convey,
the message identifying a carrier to which the device is attached such that the carrier is identifiable by a computer vision system that receives the message;
modulate a warning light based on the message,
the warning light being in a visible spectrum, and
the warning light being modulated to a particular pattern selected to convey the message; and provide the modulated warning light
the modulated warning light being a response to a ranging light from a ranging transmitter, and
the modulated warning light being directed toward the ranging transmitter.

26. The non-transitory computer-readable medium of claim 25,
wherein the one or more instructions, when executed by the one or more processors, further cause the one or more processors to:
receive the ranging light from the ranging transmitter; and
where the one or more instructions, that cause the one or more processors to modulate the warning light, cause the one or more processors to:
modulate the warning light the a response to the ranging light.

27. The non-transitory computer-readable medium of claim 25, wherein the ranging transmitter is a LIDAR transmitter and the ranging light is a LIDAR light.

28. An apparatus, comprising:
means for determining a message to convey,
the message identifying a carrier to which the apparatus is attached such that the carrier is identifiable by a computer vision system that receives the message;
means for modulating a warning light based on the message,
the warning light being in a particular portion of spectrum, and
the warning light being modulated to a particular pattern selected to convey the message; and
means for providing the modulated warning light,
the modulated warning light being a response to a ranging light from a ranging transmitter, and
the modulated warning light being directed toward the ranging transmitter.

29. The apparatus of claim 28, further comprising:
means for receiving the ranging light from the ranging transmitter,
wherein the means for modulating the warning light comprises:
means for modulating the warning light as a response to the ranging light.

30. The apparatus of claim 28, wherein the ranging transmitter is a LIDAR transmitter and the ranging light is a LIDAR light.

* * * * *